Oct. 5, 1948. L. T. SAWYER 2,450,448
METHOD OF MAKING HAIR RETAINERS
Filed Feb. 21, 1946 2 Sheets-Sheet 1

Inventor
Lester T. Sawyer
by Robert, Cushman & Grover
att'ys.

Oct. 5, 1948.   L. T. SAWYER   2,450,448
METHOD OF MAKING HAIR RETAINERS

Filed Feb. 21, 1946   2 Sheets-Sheet 2

Inventor
Lester T. Sawyer
by Roberts, Cushman & Grover
Attys.

Patented Oct. 5, 1948

2,450,448

UNITED STATES PATENT OFFICE 2,450,448

METHOD OF MAKING HAIR RETAINERS

Lester T. Sawyer, Leominster, Mass.

Application February 21, 1946, Serial No. 649,306

7 Claims. (Cl. 18—47.5)

This invention relates to the manufacture of hairpins, comb-like hair retainers and similar hair-retaining articles of the type having backs or closed ends and a plurality of projecting hair-engaging teeth, some at least of which teeth have bends or shapes to provide parts contiguous with or in hair-gripping relation to adjacent teeth.

In the manufacture of articles of the above type, it is a well-known practice first to form a cluster or group of such articles, as by injection molding, and thereafter to shape and finish the article individually, as disclosed, for example, in my prior Patent No. 2,196,815, granted April 9, 1940. Although the advantages of injection molding are well known, the individual shaping and finishing of such articles not only slows down production, but also requires a large number of man-hours to handle the output of a single molding machine with a consquent increase in manufacturing costs.

The principal object of the invention is to provide an efficient and economical method of manufacturing a hair retainer, thereby overcoming the aforementioned disadvantages. Further objects will be apparent from a consideration of the following disclosure.

In accordance with the present invention hair-retaining articles of the above type, hereinafter referred to as "hair-retainers," are produced from a suitable plastic material such as cellulose acetate or similar thermoplastic material, preferably of the type capable of being injection molded. A plurality of such hair-retainers are produced in the form of a substantially flat annular blank wherein the backs collectively define the inner periphery of the annular blank and the teeth extend divergently outward from the backs in out-of-contact relation with each other, their outer ends being circumferentially spaced and collectively defining the outer periphery of the annular blank. The annular blank thus formed consists of a plurality of interconnected hair-retainers, the individual teeth being of approximately the desired shape, but in out-of-contact relation with each other. This annular blank may then be temporarily plasticized either by being subjected to a mild degree of heat, or to an environment containing a suitable softener or solvent, or both, and while the annular blank is in relatively plastic condition it is then applied about a generally cylindrical forming block or die so as to convert it from a substantially flat annular member to a generally cylindrical crown-like member, such conversion being effective to close the out-of-contact teeth to the desired proximity. Where some of the individual teeth are bent or otherwise shaped to provide offset portions, the closing-in operation is effective to bring such offset portions into contiguous or gripping relation with the sides of the adjacent teeth, thereby providing hair-engaging elements adapted yieldingly to grip and hold strands of hair.

After having permitted the crown-like member to harden or assume a permanent set, the individual hair-retainers may be produced simply by severing the backs between teeth at such intervals as to include the desired number of teeth in each unit, and thereafter the individual hair-retainers may be polished or otherwise finished and packed for market.

In the accompanying drawings which illustrate what is now considered a preferred procedure:

Figure 4:
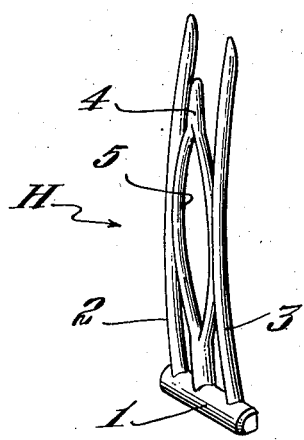
Fig. 4 is a perspective view of an individual hair-retainers severed from the blank of Fig. 3.

In the embodiment herein shown for the purpose of illustration, it is assumed that it is desired to produce by injection molding a hair-retainer H which, as shown in Fig. 4, has a closed end or back 1 integral with a pair of spaced, slightly convergent, curved teeth 2 and 3 with an interposed tooth 4 of lesser length and somewhat less curved, but formed with a bend or offset 5 contiguous with or in gripping relation to the sides of the teeth 2 and 3.

Figure 1:
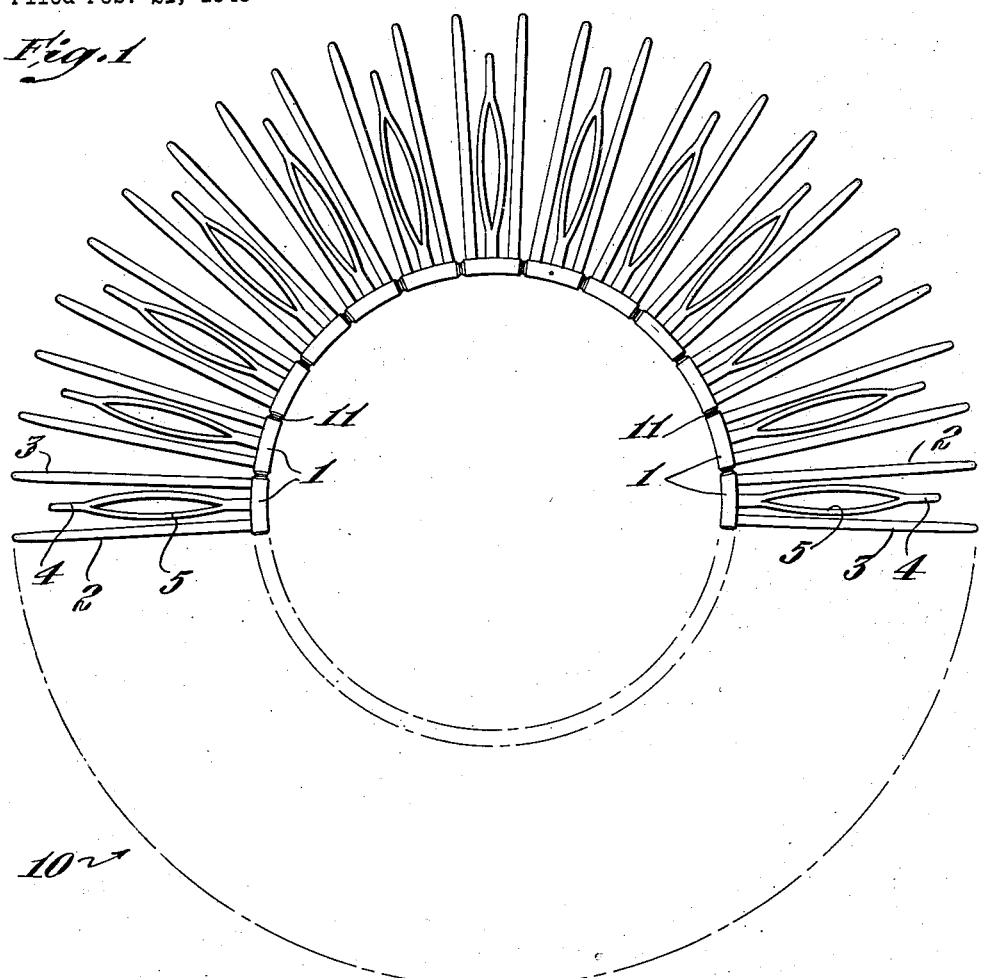
Fig. 1 is a top plan view of an annular blank produced in accordance with the present invention.

A mold of the type illustrated in my prior Patent No. 2,196,815 is formed so as to produce a substantially flat annular member 10 (Fig. 1) which, after removal of the sprue and runners, consists of a plurality of hair-retainers having their backs 1 connected end to end so as collectively to define the inner periphery of the annular member, the individual hair-retainers preferably being demarked by circumferentially spaced V-shaped grooves 11. The teeth extend approximately, although not necessarily literally, radially in out-of-contact relation.

Figure 2:
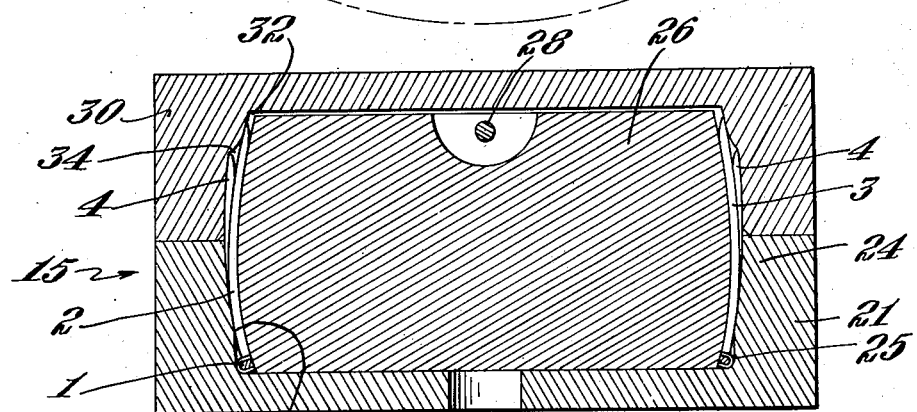
Fig. 2 is a vertical section through a generally cylindrical die for converting the annular blank of Fig. 1 into a generally cylindrical crown-like member.
Figure 3:
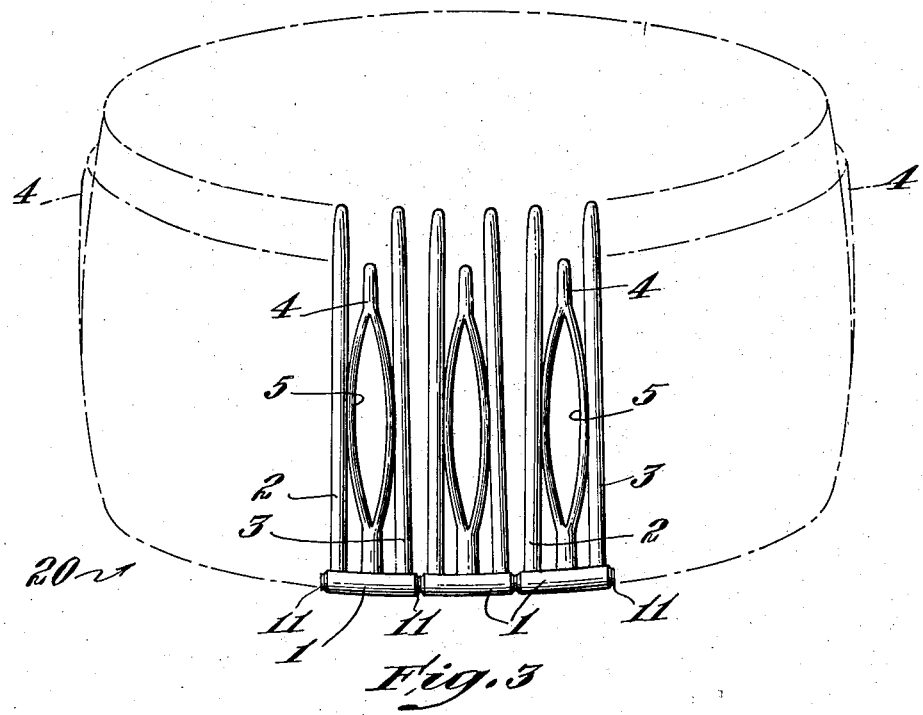
Fig. 3 is a perspective view in partial detail of the cown-like member.

The annular blank 10 is then softened, preferably by exposure to a mild degree of heat substantially less than the liquefaction temperature of the thermoplastic material, and while in a soft and plastic condition the blank is next subjected to the action of the three part forming die 15 (Fig. 2) which converts it into a crown-like, generally cylindrical blank 20, shown in Fig. 3. The die 15 comprises a base 21 formed with a generally cylindrical recess 22 with an upwardly extending side wall 24 which diverges slightly, as shown in Fig. 2. The diameter at the base of the recess 22 is slightly less than the diameter of the inner periphery of the annular member 10, and the junction of the bottom and side walls of the recess is relieved, as indicated at 25, to accommodate the interconnected backs 1 of the blank 10.

The recess 22 receives a generally cylindrical block 26, the lower half of which is similar to, but slightly smaller than the recess 22, but the diameter of its lower end is slightly greater than the diameter of the inner periphery of the blank 10, and the upper half of the block has the same form so that the entire block presents a barrel-like contour. The surface of the side wall of the lower half of the block 26 is spaced from the side wall of the recess 22 by a distance equal to the thickness of the teeth 2—4 of blank 10 so as to impart the same curved contour thereto as that of the walls of the block and recess. The block 26 may be provided with a handle 28 by means of which it may be lifted into and out of the recess 22.

A cap 30 fits over the upper half of the block 26 with its lower edge seated on the upper face of the base 21. The cap is formed with a recess 32 similar to but slightly larger than the upper half of the block 26 and relieved, as shown at 34, to receive the upper end portions of the intermediate teeth 4 so as to impart thereto a contour slightly less curved than that of the teeth 2 and 3.

In using the forming die 15, the softened blank 10 is concentrically positioned on the upper face of the base 21 and the block 26 is then applied so as to force the inner peripheral portion of the blank 10 downwardly to the bottom of the recess 22, thereby causing the backs to be rolled a quarter turn and the teeth 2—4 to be swung upwardly. The cap 30 is next applied so that the inner end of the side wall of recess 32 engages the free end portions of teeth 2 and 3 to hold them against the side wall of the block 26, and the wall of the relieved portion 34 engages the free end portions of teeth 4 to bend them inwardly to a lesser extent than the teeth 2 and 3 as illustrated in Fig. 2.

After having permitted the die and blank to cool for a period sufficient to induce a permanent set of thermoplastic material, the cap and block are removed and the re-formed blank 20 may then be lifted from the base. It will be observed that as a result of the conversion of the annular blank 10 into a generally cylindrical blank 20 not only are the divergent teeth closed in toward one another so that the offsets 5 of teeth 4 are contiguous with or close to the teeth 2 and 3, but a curved contour is imparted to the individual teeth.

The final step consists in severing the individual hair retainers H (Fig. 4) from the blank 20 by cutting through the backs 1 at the grooves 11, after which the hair retainers may, if desired, be polished or otherwise processed.

While I have shown and described one desirable embodiment of the invention it is to be understood that this disclosure is for the purpose of illustration and that various changes and modifications may be made without departing from the spirit and scope of the invention as set forth in the appended claims.

I claim:

1. The method of making hair-retainers of the kind which have a plurality of hair-engaging teeth projecting from a back, which method includes the steps of forming from suitable plastic material a substantially flat annular blank having an inner peripheral strip constituting a series of hair-retainer backs joined together at their ends and a series of spaced teeth extending divergently outward from the strip, bending the blank while in plastic condition from its flat form into approximately cylindrical form thereby causing the divergent teeth to approach one another to the desired proximity, and severing the strip into lengths to produce from the thus formed blank individual hair-retainers each having a back and a plurality of teeth.

2. The method of making hair-retainers of the kind which have a plurality of hair-engaging teeth projecting from a back, at least some of said teeth having bends in hair gripping relation to adjacent teeth, which method includes the steps of forming from suitable plastic material a substantially flat annular blank having an inner peripheral strip constituting a series of hair-retainer backs joined together at their ends and a series of spaced teeth extending divergently outward from the strip, bending the blank while in plastic condition from its flat form into approximately cylindrical form thereby causing the divergent teeth to approach one another to the desired proximity, and severing the strip into lengths to produce from the thus formed blank individual hair-retainers each having a back and a plurality of teeth.

3. The method of manufacturing hairpins and the like hair-retaining articles having closed ends or backs adjoining a plurality of hair-engaging teeth, at least some of which are bent or shaped so as to provide contiguous portions, which method comprises molding from a suitable plastic material a plurality of such articles in the form of a substantially flat annular member wherein the backs of such articles collectively define the inner periphery of said annular member and their teeth extend approximately radially in out-of-contact relation with each other with their outer ends circumferentially spaced so as collectively to define the outer periphery of said annular member, temporarily plasticizing said annular member, applying the plasticized annular member about a cylindrical member so as to convert said annular member into a generally cylindrical crown-like member wherein said out-of-contact teeth are closed in to the desired extent, and thereafter severing from said crown-like member the individual hair-retaining articles.

4. The method of manufacturing hairpins and the like hair-retaining articles each having a closed end or back adjoining a plurality of hair-engaging teeth, at least some of which are bent or shaped so as to provide contiguous portions, which method comprises molding from a suitable plastic material a plurality of such articles in the form of a substantially flat annular member wherein the backs of such articles are interconnected and collectively define the inner periphery of said annular member and their teeth extend approximately radially in out-of-contact relation with each other with their outer ends circumferentially spaced so as collectively to define the outer periphery of said annular member, temporarily plasticizing said annular member, applying the plasticized annular member about a cylindrical member so as to convert said annular member into a generally cylindrical crown-like member wherein said out-of-contact teeth are closed in to bring at least some of said teeth into contiguous relation, and thereafter severing from said crown-like member the individual hair-retaining articles.

5. The method of manufacturing hairpins and the like hair-retaining articles each having a closed end or back adjoining a plurality of hair-engaging teeth including alternate teeth having offset portions engaging the adjacent teeth, which method comprises molding from a suitable plastic material a plurality of such articles in the form of a substantially flat annular member wherein the backs of such articles collectively define the inner periphery of said annular member and their teeth extend approximately radially in out-of-contact relation with each other with their outer ends circumferentially spaced so as collectively to define the outer periphery of said annular member, temporarily plasticizing said annular member, applying the plasticized annular member about a cylindrical member so as to convert said annular member into a generally cylindrical crown-like member wherein said out-of-contact teeth are closed in to bring the teeth having offset portions into engagement with adjacent teeth, and thereafter severing from said crown-like member the individual hair-retaining articles.

6. The method of making hair-retainers of the kind which have a plurality of hair engaging teeth projecting from a back, which method includes the steps of molding from suitable plastic material a substantially flat annular blank having an inner peripheral strip constituting a series of hair-retainer backs joined together at their ends and a series of spaced teeth extending divergently outward from the strip, bending the blank while in plastic condition from its flat form into approximately cylindrical form thereby causing the divergent teeth to approach one another to the desired proximity and simultaneously impart a curvature to some of the teeth, and severing the strip into lengths to produce from the thus formed blank individual hair retainers each having a back and a plurality of teeth.

7. The method of manufacturing hair pins and the like hair-retaining articles having closed ends or backs adjoining a plurality of hair-engaging teeth, at least some of which are bent or shaped so as to provide contiguous portions, which method comprises molding from a suitable plastic material a plurality of such articles in the form of a substantially flat annular member wherein the backs of such articles collectively define the inner periphery of said annular member and their teeth extend approximately radially in out-of-contact relation with each other with their outer ends circumferentially spaced so as collectively to define the outer periphery of said annular member, temporarily plasticizing said annular member, applying the plasticized annular member about a generally cylindrical member having a convergent wall portion so as to convert said annular member into a generally cylindrical crown-like member wherein said out-of-contact teeth are closed in to the desired extent and simultaneously impart a curvature to some of said teeth, and thereafter severing from said crown-like member the individual hair-retaining articles.

LESTER T. SAWYER.

REFERENCES CITED

The following references are of record in the file of this patent:

UNITED STATES PATENTS

| Number | Name | Date |
|---|---|---|
| 1,893,597 | Queen | Jan. 10, 1933 |
| 2,139,541 | Farnsworth | Dec. 6, 1938 |
| 2,196,815 | Sawyer | Apr. 9, 1940 |
| 2,338,735 | Person | Jan. 11, 1944 |